United States Patent [19]
Saika et al.

[11] 4,064,342
[45] Dec. 20, 1977

[54] METHOD OF MANUFACTURING SULFATED CELLULOSE

[75] Inventors: Daini Saika, Chiba; Takuma Yanagawa, Tokyo; Masaaki Mizuta, Narashino; Isamu Kadoya, Tokyo, all of Japan

[73] Assignee: Lion Fat and Oil Co., Ltd., Tokyo, Japan

[21] Appl. No.: 598,732

[22] Filed: July 24, 1975

[30] Foreign Application Priority Data

July 30, 1974 Japan .................................. 49-87776
July 30, 1974 Japan .................................. 49-87777

[51] Int. Cl.$^2$ ............................................. C08B 5/14
[52] U.S. Cl. .................................................. 536/59
[58] Field of Search .......................... 260/215; 536/59

[56] References Cited

U.S. PATENT DOCUMENTS

| 2,138,778 | 11/1938 | Rigby | 260/215 |
| 2,697,093 | 12/1954 | Jones | 260/215 |
| 3,008,952 | 11/1961 | Touey et al. | 260/215 |
| 3,528,963 | 9/1970 | Reid | 260/215 |

*Primary Examiner*—Eugene C. Rzucidlo
*Assistant Examiner*—H. H. Fletcher
*Attorney, Agent, or Firm*—Carroll F. Palmer

[57] ABSTRACT

A method of manufacturing sulfated cellulose using any of the Lewis base-$SO_3$ complexes as a sulfating agent, which characteristically consists in thermally activating cellulose prior to its sulfation in tertiary amines or a mixture of tertiary amines and amine hydrochlorides, thereby enabling alkali metal salts of cellulose sulfate to be favorably accepted as a binder for dentrifice compositions.

9 Claims, No Drawings

METHOD OF MANUFACTURING SULFATED CELLULOSE

BACKGROUND OF THE INVENTION

This invention relates to a novel method of manufacturing sulfated cellulose and more particularly to a method of activating cellulose prior to its sulfation.

The U.S. Pat. No. 3,528,963 sets forth the process of causing cellulose prior to its sulfation to imbibe boiling water in order to elevate the sulfation reaction. However, sulfation of cellulose after said imbibition is accompanied with undesirable results such as loss of sulfating agent due to presence of water and hydrolysis of cellulose. The Canadian Pat. No. 921,903 discloses the process of treating cellulose prior to its sulfation with dimethyl formamide (DMF). Further, Japanese Patent Application early desclosed under No. 89786/74 describes the process of treating cellulose prior to its sulfation with lower ketones such as acetone. Another U.S. Pat. No. 3,720,659 adopts the process of dissolving cellulose, before sulfation, in cuprammonium solution, and crystallizing out cellulose in an activated state. The last three prior art methods omit the use of water and indeed eliminate drawbacks resulting from the presence of water in the sulfation reaction system of cellulose, but still are accompanied with the disadvantage that activation of cellulose prior to its sulfation has been experimentally found to be insufficient.

Japanese Patent Application early disclosed under No. 89787/74 provides the process of manufacturing sulfated cellulose which is characterized by introducing hydrochlorides of basic nitrogen compounds into the sulfation reaction system for the smooth progress of cellulose sulfation, thereby providing a clear or hazy aqueous solution containing sulfated cellulose which has a high viscosity and a large degree of substitution (hereinafter abbreviated as DS). DS is measured with respect to the residual radical of glucose and indicated as 3 where substitution is fully carried out. Said disclosed Japanese Patent Application No. 89787/74 indeed has great advantages, but is still accompanied with the drawbacks that amine hydrochlorides are difficult to recover and a large amount of washing solvent has to be used in purifying the reaction product.

SUMMARY OF THE INVENTION

It is accordingly an object of this invention to provide a method of manufacturing sulfated cellulose which can fully activate cellulose prior to its sulfation.

Another object of the invention is to provide sulfated cellulose having a relatively large degree of substitution.

Still another object of the invention is to provide alkali metal salts of cellulose sulfate which are adapted to form a clear or hazy aqueous solution which has a low concentration, high viscosity and little tendency to present cobwebbing. A further object of the invention is to provide alkali metal salts of cellulose sulfate, which can provide a clear or hazy aqueous solution which presents a gelled state when supplied with physical energies generated by, for example, vibration, impingement or shearing.

The above objects of this invention can be attained by providing a method of manufacturing sulfated cellulose using any of the Lewis base-SO₃ complexes as a sulfating agent, which characteristically consists in thermally activating cellulose prior to its sulfation in tertiary amines or a mixture of tertiary amines and amine hydrochlorides.

DETAILED DESCRIPTION OF THE INVENTION

Raw cellulosic materials include, for example, wood pulp and cotton linters. According to the method of this invention, any of these cellulosic materials is thermally activated prior to sulfation in tertiary amines, or a mixture of tertiary amines and amine hydrochlorides.

The tertiary amines used in the method of the invention include a pyridinic group (pyridine, picoline and lutidine), trimethyl amines, triethyl amine, tripropyl amine and tributyl amine. Particularly effective among these tertiary amines is the pyridinic group. However, the amines may be used in combination.

Where amine hydrochlorides are not mixed, the proportion of any of said tertiary amines is chosen to be 2 to 50 or preferably 3 to 20 parts by weight based on 1 part by weight of cellulose. Full activation of raw cellulose by infiltrating the tertiary amine in the raw cellulose or adsorbing the tertiary amine to the raw cellulose requires application of more than 2 parts by weight of the tertiary amine based on 1 part by weight of the raw cellulose. Use of more than 50 parts of the tertiary amine fails to promote the sulfation of the raw cellulose as much as expected and consequently is uneconomical. Where a mixture of the tertiary amine and amine hydrochlorides is used, the proportion of the tertiary amine is chosen to be 3 to 500 parts by weight based on 1 part by weight of the raw cellulose.

Though varying with the kind of the tertiary amine used, the conditions for activation of the raw cellulose are preferred to be as follows:

Activation temperature: 30° to 150° C
Activation time: 0.5 to 5 hours

The amine hydrochlorides used in the method of this invention include compounds whose structures may be expressed by the general formulas I and II given below:

General formula I

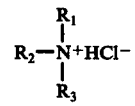

where: $R_1$, $R_2$, $R_3$ = hydrogen, alkyl radicals having six or less carbon atoms or phenyl radical General formula II

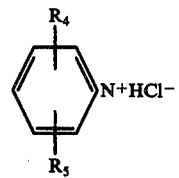

where: $R_4$, $R_5$ = hydrogen or $CH_3$

Compounds of the general formula I include $NH_4Cl$, $CH_3NH_2.HCl$, $(CH_3)_2NH.HCl$, $(CH_3)N.HCl$, $C_2H_5NH_2.HCl$, $(C_2H_5)_2NH.HCl$ and $(C_2H_5)_3N.HCl$. Compounds of the general formula II include

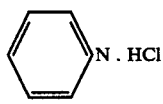

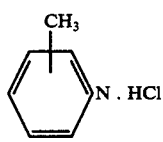

and

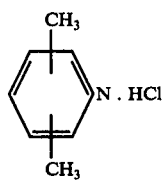

The amine hydrochlorides of both general formulas I, II may be used in combination.

According to the method of this invention, the proportion of any of the above-mentioned amine hydrochlorides is chosen to be 0.2 to 12 or preferably 1 to 4 mols based on the raw cellulose used (as measured in glucose units).

Full infiltration of amine hydrochlorides in the raw cellulose or adsorption of said hydrochlorides to the raw cellulose for activation thereof requires at least 0.2 mol of the amine hydrochlorides to be used per mol of the raw cellulose. Application of a larger proportion of the amine hydrochlorides than 12 mols only gives rise to difficulties in operation and is also uneconomical. After thus activated, the raw cellulose is sulfated using any of the Lewis base-$SO_3$ complexes as a sulfating agent. The Lewis base-$SO_3$ complexes include trimethyl amine-$SO_3$, triethyl amine-$SO_3$, pyridine-$SO_3$, picoline-$SO_3$, lutidine-$SO_3$, dimethyl formamide-$SO_3$, dioxane-$SO_3$, and tri-n-butyl phosphate-$SO_3$.

It will be noted that substitution of sulfuric acid or chloro-sulfonic acid for the Lewis base-$SO_3$ complexes fails to provide sulfated cellulose for which this invention is intended. Following is the reason. The unduly high acidity of sulfuric acid or chloro-sulfonic acid leads to a side reaction such as hydrolysis of raw cellulose which decreases the degree of polymerization, only providing objectionably colored sulfated cellulose of low viscosity and substitution. Further, it may be theoretically contemplated to use sulfamic acid as a sulfating agent. However, this process results in low reactivity and consequently needs application of higher temperature than otherwise required, only providing sulfated cellulose of low polymerization and substitution.

In contrast, application of the Lewis base-$SO_3$ complexes adopted in this invention eliminates the necessity of using an acid of high acidity in the cellulose-sulfating process, and allows the choice of a variety of reaction dispersants. Further, the sulfation reactivity of raw cellulose can be freely changed by selecting the desired kind of the Lewis base-$SO_3$ complexes.

Sulfation dispersants should be such solvents as do not react with a sulfating agent, and may consist of halogenated hydrocarbons such as dichloromethane, and 1,2-dichloroethane; tertiary amines such as pyridine, picoline, lutidine, trimethyl amine and triethyl amine; hexane; and dimethyl sulfoxide.

The proportion of the sulfation dispersant is preferably chosen to be 10 to 100 parts by weight based on 1 part of raw cellulose where the cellulose takes the fibrous form and 5 to 50 parts by weight where the cellulose takes the powdery form.

Addition of tertiary amine hydrochlorides such as triethyl amine, pyridine, picoline and lutidine to a system of sulfation offers convenience in providing sulfated cellulose for which this invention is intended. Particularly halogenated hydrocarbons used as a sulfation dispersant present a prominent effect. Addition of tertiary amine hydrochlorides is preferred to be 0.2 to 12 mols per glucose unit of raw cellulose.

Sulfation temperature is suitably chosen according to the reactivity of the selected kind of the Lewis base-$SO_3$ complexes. For example, where dioxane-$SO_3$ complex of high reactivity is used as a sulfating agent, the sulfation temperature is desired to be lower than 5° C. Where pyridine-$SO_3$ complex is applied, the sulfation temperature is preferred to range between 40° and 70° C.

Sulfated cellulose thus prepared is treated by the known process using a neutralizing agent such as NaOH, $NaHCO_3$, $Na_2CO_3$, $CH_3COONa$, KOH, $K_2CO_3$, $KHCO_3$, $CH_3COOK$ or $CH_3ONa$ to be converted into an alkali metal salt. After dissolved in water or made to imbibe water, the alkali metal salt of cellulose sulfate becomes gelatinizable upon application of physical energies generated by, for example, vibration, impingement or shearing.

Though not clearly defined, the reason why the sulfated cellulose prepared by the method of this invention presents a hazy aqueous solution which has a relatively high substitution, low concentration and prominent viscosity is supposed to be that tertiary amines and amine hydrochlorides are infiltrated between the molecules of cellulose to convert crystallized regions into noncrystallized regions, thereby attaining the smooth progress of sulfation of the cellulose.

The alkali metal salts of cellulose sulfate prepared by the method of this invention provide a clear or hazy aqueous solution which has low concentration and prominent viscosity and display an excellent effect as a thickening agent. Particularly where incorporated in dentifrice, said alkali metal salts can improve the long stability of the dentifrice and increase the pleasant feeling of the user.

This invention will be more fully understood by reference to the examples which follow.

EXAMPLE 1

A reactor provided with a thermometer, stirrer, air-cooling pipe and funnel tube was charged with 10.0g of wood pulp sheeting having a viscosity of 5 defined in the Japanese Industrial Standard P 9001 5.5.A for paper-making pulp and cut up into angular cubic chips measuring 2 to 3 mm on each side and 250 ml of picoline. The charged mass was heated 2 hours at 110° C for activation of the raw cellulose. After cooling, 23.0g of pyridine hydrochloride was added and 12.3g of $SO_3$ (liquid) at lower temperature than 40° C was slowly dripped into the charged mass. Upon completion of the dripping, reaction was continued 6 hours at 50° C. Upon completion of the reaction, the picoline was removed, and the reaction system was immersed in 100 ml of methanol in which 6.2g of sodium hydroxide was dissolved, and allowed to stand overnight at room temperature for neutralization. After removal of the methanol, the neutralized mass was dried, providing 22.4g of sodium salt of cellulose sulfate having a DS value of 1.62. An aqueous solution containing 1% sulfated cellulose indicated a viscosity of 4,500 centipoises (as measured by the BL type viscometer operated at 6 r.p.m and 25° C).

10.0g of the sodium salt of cellulose sulfate was changed into a hazy aqueous solution containing 1% of this material. Said solution was treated 23 minutes by a homogenizer (manufactured by Nippon Seiki K.K.) operated at 10,000 r.p.m. The homogenized solution was poured into a larger amount of isopropanol for precipitation. After filtration and drying, the precipitate provided 9.8g of desired product having a DS value of 1.61. An aqueous solution containing 0.5% the product indicated a viscosity of 5000 centipoises, and an aqueous solution containing 1% the product was too much gelled for measurement of viscosity.

EXAMPLE 2

A reactor provided with a thermometer, stirrer, air-cooling pipe and funnel tube was charged with 10.0g of wood pulp sheeting having a viscosity of 4.8 defined in the Japanese Industrial Standards P 9001 5.5.A for dissolved pulp and cut up into angular cubic chips measuring 2 to 3 mm on each side and 50.0 ml of pyridine. The charged mass was heated 4 hours at 80° C for activation of the cellulose. After cooling, 150 ml of pyridine was added and 9.0g of $SO_3$ (liquid) kept at lower temperature than 20° C was slowly dripped into the charged mass. Upon completion of the dripping, reaction was continued 5 hours at 50° C. Upon completion of the reaction, the pyridine was removed, and the reaction system was immersed in 80 ml of methanol in which 5.0g of sodium hydroxide was dissolved and allowed to stand overnight at room temperature for neutralization. After removal of the methanol, the neutralized mass was dried, providing 21.1g of sodium salt of cellulose sulfate. Said sodium salt had a DS value of 1.44. An aqueous solution containing 1% of the sodium salt indicated a viscosity of 970 centipoises (as measured by the BL type viscometer operated at 6 r.p.m. and 25° C). 10.0g of said sodium salt was changed into a 2% aqueous solution of said sodium salt. Said solution was treated 10 minutes by a homogenizer (manufactured by Nippon Seiki K.K.) operated at 10,000 r.p.m. The homogenized solution was poured into a large amount of isopropanol for precipitation. After filtration and drying, the precipitate provided 9.8g of desired product having a DS value of 1.42. An aqueous solution containing 0.5% said product had a viscosity of 1050, and a 4% aqueous solution of said product was too much gelled for measurement of viscosity.

EXAMPLE 3

Substantially the same operation was carried out as in Example 2, excepting that 25g of triethyl amine hydrochloride was added in addition to 150 ml of pyridine, providing sodium salt of cellulose sulfate, in which an aqueous solution containing 1% said sodium salt had a viscosity of 1020 centipoises. When subjected to physical energy in the same manner as in Example 2, the sodium salt of cellulose sulfate had a DS value of 1.42. A 0.5% aqueous solution of this material had a viscosity of 1040 centipoises and a 4% aqueous solution of this material was too much gelled for measurement of viscosity.

EXAMPLE 4

Raw cellulose was sulfated in substantially the same manner as in Example 2, excepting that 150 ml of pyridine used in Example 2 was replaced by 150 ml of 1,2-dichloroethane and 25g of pyridine hydrochloride. After removal of the 1,2-dichloroethane and pyridine, the sodium salt of cellulose sulfate had a DS value of 1.64 and a 1% aqueous solution of said sodium salt indicated a viscosity of 1580. When subjected to physical energy in the same manner as in Example 2, the sodium salt of cellulose sulfate had a DS value of 1.64. A 0.5% aqueous solution of this material had a viscosity of 1980 centipoises, and a 2% hazy aqueous solution of this material was too much gelled for measurement of viscosity.

EXAMPLE 5

A reactor provided with a thermometer, stirrer, air-cooling pipe and funnel tube was charged with 10.0g of wood pulp sheeting having a viscosity of 4.8 defined in the Japanese Industrial Standards P 9001 5.5.A for dissolved pulp and cut up into angular cubic chips measuring 2 to 3 mm on each side and 25.0 ml of pyridine. The charged mass was heated 4 hours at 80° C for activation of the raw cellulose. After cooling, 150 ml of 1,2-dichloroethane and 22.0g of pyridine hydrochloride were added. 9.9g of $SO_3$ (liquid) kept at lower temperature than 40° C was slowly dripped into the mass. Upon completion of the dripping, reaction was continued 7 hours at 55° C. Upon completion of the reaction, the 1,2-dichloroethane was removed. The reaction system was immersed in 80 ml of methanol in which 5.0g of sodium hydroxide was dissolved, and allowed to stand overnight at room temperature for neutralization. After removal of the methanol, the neutralized mass was dried, providing 22.0g of sodium salt of cellulose sulfate having a DS value of 1.60. An aqueous solution containing 1% said sodium salt indicated a viscosity of 1950 centipoises (as measured by the BL type viscometer operated at 6 r.p.m. and 25° C).

10.0g of said sodium salt of cellulose sulfate was changed into a 2% aqueous solution of this material. The solution was treated 13 minutes by a homogenizer (manufactured by Nippon Seiki K.K.) operated at 10,000 r.p.m. The homogenized mass was poured into a large amount of isopropanol for precipitation. After filtration and drying, the precipitate provided 9.9g of desired product having a DS value of 1.59g. A 0.5% aqueous solution of this product had a viscosity of 2050 centipoises, and a 2% aqueous solution of this product was too much gelled for measurement of viscosity.

EXAMPLE 6

10.0g of cotton linters pulp having a viscosity of 20 defined in the Japanese Industrial Standards P 9001 5.5.A and cut up into angular cubic chips measuring 2 to 3 mm on each side and 100 ml of triethyl amine were heated 3 hours with stirring at 110° C for activation of the raw cellulose.

A reactor provided with a thermometer, stirrer, air-cooling pipe and funnel tube was first charged with 300 ml of 1,2-dichloroethane. Thereafter 14.9g of $SO_3$ (liquid) kept at a lower temperature than 25° C was slowly dripped into the reactor. Upon completion of the dripping, the aforesaid activated cellulose was added with stirring. Reaction was continued 8 hours at 55° C. Upon completion of the reaction, the 1,2-dichloroethane was removed. The reaction system was immersed in 100 ml of methanol in which 7.5g of sodium hydroxide was dissolved and allowed to stand overnight at room temperature for neutralization. After removal of the methanol, the neutralized mass was dried, providing 20.9g of sodium salt of cellulose sulfate having a DS value of 1.43. A 1% aqueous solution of this material indicated a viscosity of 7500 centipoises (as measured by the BL type viscometer operated at 6 r.p.m. and 25° C).

10.0g of the sodium salt of cellulose sulfate was changed into a 2% aqueous solution of this material. The solution was treated 30 minutes by a homogenizer (manufactured by Nippon Seiki K.K.) operated at 10,000 r.p.m. The treated solution was poured into a larger amount of isopropanol for precipitation. After filtration and drying, the precipitate provided 9.8g of desired product having a DS value of 1.42. A 0.5% aqueous solution of this product indicated a viscosity of 1300 centipoises, and a 1% aqueous solution of this product was too much gelled for measurement of viscosity.

EXAMPLE 7

A reactor provided with a thermometer, stirrer, air-cooling pipe and funnel tube was charged with 10.0g of wood pulp sheeting having a viscosity of 8 defined in the Japanese Industrial Standards P 9001 5.5.A for dissolved pulp and cut up into angular cubic chips measuring 2 to 3 mm on each side and 50 ml of picoline. The charged mass was heated 2 hours at 120° C for activation of the raw cellulose. After cooling, 200 ml of 1,2-dichloroethane and 15g of picoline hydrochloride were added and 9.5g of $SO_3$ (liquid) kept at lower temperature than 30° C was slowly dripped into the mass. Upon completion of the dripping, reaction was continued 7 hours at 55° C. Upon completion of the reaction, the 1,2-dichloroethane and picoline were removed. The reaction system was immersed in 100 ml of methanol in which 6.5g of sodium hydroxide was dissolved and allowed to stand overnight at room temperature for neutralization. After removal of the methanol, the neutralized mass was dried, providing 22.3g of sodium salt of cellulose sulfate having a DS value of 1.70. A 1% aqueous solution of this material indicated a viscosity of 6700 centipoises (as measured by the BL type viscometer operated at 6 r.p.m. and 25° C). A 2% aqueous solution of 10.0g of said sodium salt was treated 10 minutes by a homogenizer (manufactured by Nippon Seiki K.K.) operated at 10,000 r.p.m. The homogenized mass was poured into a large amount of isopropanol for precipitation. After filtration and drying, the precipitate provided 9.5g of desired product having a DS value of 1.70. A 0.5% aqueous solution of this product indicated a viscosity of 5800, and a 1% aqueous solution of this product was too much gelled for measurement of viscosity.

EXAMPLE 8

A reactor provided with a thermometer, stirrer, air-cooling pipe and funnel tube was charged with 10.0g of wood pulp sheeting having a viscosity of 8 defined in the Japanese Industrial Standards P 9001 5.5.A for dissolved pulp and cut up into angular cubic chips measuring 2 to 3 mm on each side and 100 ml of triethyl amine. The charged mass was heated 3 hours at 70° C for activation of the raw cellulose. After cooling, 4.0g of triethyl amine hydrochloride was added, and 11.5g of $SO_3$ (liquid) kept at a lower temperature than 10° C was slowly dripped into the mass. Upon completion of the dripping, reaction was continued 5 hours at 55° C. Upon completion of the reaction, the triethyl amine was removed. The reaction system was immersed in 100 ml of methanol in which 6.1g of sodium hydroxide was dissolved and allowed to stand overnight at room temperature for neutralization. After removal of the methanol, the neutralized mass was dried, providing 21.0g of sodium salt of cellulose sulfate having a DS value of 1.40. A 1% aqueous solution of this material had a viscosity of 5600 centipoises (as measured by the BL type viscometer operated at 6 r.p.m. and 25° C). 10.0g of the sodium salt of cellulose fulfate was changed into a 2% aqueous solution of said sodium salt. The solution was treated 10 minutes by a homogenizer (manufactured by Nippon Seiki K.K.) operated at 10,000 r.p.m. The homogenized mass was poured into a large amount of isopropanol for precipitation. After filtrated and drying, the precipitate provided 9.5g of desired product having a DS value of 1.40. A 0.5% aqueous solution of this product indicated a viscosity of 4800 centipoises, and a 1% aqueous solution of this product was too much gelled for measurement of viscosity.

EXAMPLE 9

10.0g of wood pulp powder having a viscosity of 5 defined in the Japanese Industrial Standards P 9001 5.5.A was heated 25 minutes at 105° C in a mixture of 60.0 ml of triethyl amine and 26.0g of triethyl amine hydrochloride. After filtration, the reacted mass provided activated cellulose.

A reactor fitted with a thermometer, stirrer, air-cooling pipe and funnel tube was first charged with 250 ml of 1,2-dichloroethane and 9.5g of dimethyl formamide. 10.0g of $SO_3$ (liquid) kept at a lower temperature than 0° C was slowly dripped into the mass. Upon completion of the dripping, the above-mentioned activated cellulose was added. Reaction was continued 3 hours at 5° C with stirring. Upon completion of the reaction, the triethyl amine was removed. The reaction system was immersed in 120 ml of methanol in which 5.2g of sodium hydroxide was dissolved and allowed to stand overnight at room temperature for neutralization. After removal of the methanol, the neutralized mass was dried, providing 22.0g of sodium salt of cellulose sulfate having a DS value of 1.58. A 1% aqueous solution of said sodium salt indicated a viscosity of 1550 centipoises (as measured by the BL type viscometer operated at 6 r.p.m. and 25° C).

10.0g of the sodium salt of cellulose sulfate was changed into a 2% aqueous solution of this material. The solution was treated 2 minutes by a homogenizer (manufactured by Nippon Seiki K.K.) operated at 10,000 r.p.m. The homogenized mass was poured into a large amount of isopropanol for precipitation. After filtration and drying, the precipitate provided 9.9g of desired product having a DS value of 1.57. A 0.5% aqueous solution of this product indicated a viscosity of 1650 centipoises, and a 2% aqueous solution of said product was too much gelled for measurement of viscosity.

CONTROL 10.0g of cotton linters pulp having a viscosity of 20 defined in the Japanese Industrial Standards P 9001 5.5.A was boiled 1 hour in 100g of water. After cooling, the water was filtered out. The boiled cellulose was immersed in 50g of triethyl amine, which was later filtered out. This immersion was repeated two more times to replace the water contained in the cellulose by triethyl amine.

A reactor provided with a thermometer, stirrer, air-cooling pipe and funnel tube was first charged with 300 ml of triethyl amine and 15.1g of $SO_3$ (liquid) kept at a lower temperature than 25° C was slowly dripped into the charged mass. Upon completion of the dripping, the above-mentioned activated cellulose was added. Reaction was continued 7 hours at 50° C. Upon completion of the reaction, the triethyl amine was removed. The reaction system was immersed in 120 ml of methanol in which 7.8g of sodium hydroxide was dissolved, and allowed to stand overnight at room temperature for neutralization. After removal of the methanol, the neutralized mass was dried, providing sodium salt of cellulose sulfate having a DS value of 1.03. A 1% aqueous solution of this material indicated a viscosity of 3,100 centipoises (as measured by the BL type viscometer operated at 6 r.p.m. and 25° C). When the sodium salt of cellulose sulfate was treated by the same homogenizer as used in Example 1, the resultant product had a DS value of 1.03, and a 0.5% aqueous solution of said product indicated a viscosity of 4350 centipoises.

EXAMPLE 10

10.0g of cotton linters pulp having a viscosity of 20 defined in the Japanese Industrial Standards P 9001 5.5.A and cut up into angular cubic chips measuring 2 to 3 mm on each side was heated 2 hours at 110° C with stirring in a mixed solution of 100 ml of picoline and 25.0g of picoline hydrochloride, followed by filtration to produce activated cellulose.

A reactor provided with a thermometer, stirrer, air-cooling pipe and funnel tube was first charged with 300 ml of triethyl amine, and 15.1g of $SO_3$ (liquid) kept at a lower temperature than 25° C was slowly dripped into the charged mass. Upon completion of the dripping, the above-mentioned activated cellulose was added. Reaction was continued 7 hours at 50° C with stirring. Upon completion of the reaction, the triethyl amine was removed. The reaction system was immersed in 120 ml of methanol in which 7.8g of sodium hydroxide was dissolved and allowed to stand overnight at room temperature for neutralization. After removal of the methanol, the neutralized mass was dried, providing 21.6g of sodium salt of cellulose sulfate having a DS value of 1.52.

A 1% aqueous solution of this material had a viscosity of 8,000 centipoises (as measured by the BL type viscometer operated at 6 r.p.m. and 25° C).

10.0g of the sodium salt of cellulose sulfate was changed into a 2% aqueous solution of the sodium salt. The solution was treated 40 minutes by a homogenizer (manufactured by Nippon Seiki K.K.) operated at 10,000 r.p.m. The homogenized mass was poured into a large amount of isopropanol for precipitation. After filtration and drying, the precipitate provided 9.7g of desired product having a DS value of 1.51. A 0.5% aqueous solution of said product indicated a viscosity of 10,000 centipoises, and a 1% aqueous solution of said product was too much gelled for measurement of viscosity.

EXAMPLE 11

10.0g of wood pulp sheeting having a viscosity of 4.8 defined in the Japanese Industrial Standards P 9001 5.5.A for dissolved pulp and cut up into angular cubic chips measuring 2 to 3 mm on each side was heated 30 minutes at 105° C in a mixed solution of 70 ml of pyridine and 28.0g of pyridine hydrochloride, followed by filtration to produce activated cellulose.

A reactor provided with a thermometer, stirrer, air-cooling pipe and funnel tube was first charged with 250 ml of pyridine. 10.3g of $SO_3$ (liquid) kept at a lower temperature than 25° C was slowly dripped into the charged mass. Upon completion of the dripping, the above-mentioned activated cellulose was added. Reaction was continued 8 hours at 50° C with stirring. Upon completion of the reaction, the pyridine was removed. The reaction system was dissolved in water and thereafter neutralized by an aqueous solution of sodium hydroxide until the pH of the neutralized solution indicated a value of 8 to 9. The neutralized mass was poured into a large amount of isopropanol for precipitation. After filtration and drying, the precipitate provided 22.3g of sodium salt of cellulose sulfate having a DS value of 1.62. A 1% aqueous solution of said sodium salt indicated a viscosity of 1800 centipoises (as measured by the BL type viscometer operated at 6 r.p.m. and 25° C).

10.0g of the sodium salt of cellulose sulfate was changed into an about 2% aqueous solution of the sodium salt. The solution was treated 15 minutes by a homogenizer (manufactured by Nippon Seiki K.K.). The homogenized mass was poured into a large amount of isopropanol for precipitation. After filtration and drying, the precipitate provided 9.8g of desired product having a DS value of 1.61. A 0.5% aqueous solution of the product indicated a viscosity of 1910 centipoises, and a 4% aqueous solution of this product was too much gelled for measurement of viscosity.

EXAMPLE 12

10.0g of wood pulp sheeting having a viscosity of 8 defined in the Japanese Industrial Standards P 9001 5.5.A for paper-making pulp and cut up into angular cubic chips measuring 2 to 3 mm on each side was heated 1 hour at 110° C in a mixed solution of 80 ml of pyridine and 25.0g of pyridine hydrochloride, followed by filtration to produce activated cellulose.

A reactor provided with a thermometer, stirrer, air-cooling pipe and funnel tube was first charged with 250 ml of dichloromethane, and 12.8g of $SO_3$ (liquid) kept at a lower temperature than 10° C was dripped into the charged mass. Upon completion of the dripping, the above-mentioned activated cellulose was added. Reaction was continued 5 hours at 20° C. Upon completion of the reaction, the dichloromethane was removed. The reaction system was dissolved in water and thereafter neutralized by an aqueous solution of sodium hydroxide until the pH of the neutralized solution indicated a value of 8 to 9. The neutralized solution was poured into a large amount of isopropanol for precipitation. After filtration and drying, the precipitate provided 20.7g of sodium salt of cellulose sulfate having a DS value of 1.53. A 1% aqueous solution of said sodium salt indicated a viscosity of 4300 (as measured by the BL type viscometer operated at 6 r.p.m. and 25° C).

10.0g of the sodium salt of cellulose sulfate was changed into an about 2% aqueous solution of the sodium salt. The solution was treated 20 minutes by a homogenizer (manufactured by Nippon Seiki K.K.) operated at 10,000 r.p.m. The homogenized mass was poured into a large amount of isopropanol for precipitation. After filtration and drying, the precipitate provided 9.7g of desired product having a DS value of 1.51. A 0.5% aqueous solution of this product indicated a viscosity of 4800 centipoises, and a 1% aqueous solution of this product was too much gelled for measurement of viscosity.

EXAMPLE 13

10.0g of wood pulp powder having a viscosity of 4.8 defined in the Japanese Industrial Standards P 9001 5.5.A was heated 20 minutes at 165° C in a mixture of 50 ml of pyridine and 18.0g of pyridine hydrochloride, followed by filtration to produce activated cellulose.

A reactor provided with a thermometer, stirrer, air-cooling tube and funnel tube was first charged with 100 ml of 1,2-dichloroethane and 26.0g of pyridine. 10.4g of $SO_3$ (liquid) kept at a lower temperature than 25° C was slowly dripped into the charged mass. Upon completion of the dripping, the above-mentioned activated cellulose was added. Reaction was continued 6 hours at 50° C with stirring. Upon completion of the reaction, the 1,2-dichloroethane was removed. The reaction system was immersed in 50 ml of methanol in which 5.4g of sodium hydroxide was dissolved and allowed to stand overnight at room temperature for neutralization. After removal of the methanol, the neutralized mass was dried, providing 22.5g of sodium salt of cellulose sulfate having a DS value of 1.64. A 1% aqueous solution of said sodium salt indicated a viscosity of 2050 centipoises (as measured by the BL type viscometer operated at 6 r.p.m. and 25° C).

10.0g of the sodium salt of cellulose sulfate was changed into an about 2% aqueous solution of the sodium salt. The solution was treated 3 minutes by a homogenizer (manufactured by Nippon Seiki K.K.) operated at 10,000 r.p.m. The homogenized mass was poured into a large amount of isopropanol for precipitation. The precipitate provided 9.9g of desired product having a DS value of 1.63. A 0.5% aqueous solution of this product indicated a viscosity of 1500 centipoises, and a 3% aqueous solution of this product was too much gelled for measurement of viscosity.

What we claim is:

1. In the method of manufacturing sulfated cellulose by sulfating cellulose with Lewis base-$SO_3$ complex in a reaction dispersant, the improvement comprising, prior to sulfation, activating the cellulose for 20 minutes to 5 hours at 30° to 165° C in tertiary amines in an amount of 2 to 50 parts by weight based upon each part by weight of cellulose.

2. The method of manufacturing sulfated cellulose according to claim 1, wherein the tertiary amines are selected from the group consisting of pyridine, picoline, lutidine, trimethyl amine, triethyl amine, tripropyl amine and tributyl amine, and mixtures thereof.

3. The method of manufacturing sulfated cellulose according to claim 1, wherein the reaction dispersant is selected from the group consisting of pyridine, picoline, lutidine, trimethyl amine, triethyl amine, dichloromethane, 1,2-dichloroethane, hexane, dimethyl sulfoxide and mixtures thereof.

4. The method of manufacturing sulfated cellulose according to claim 1, wherein the proportion of the reaction dispersant is chosen to be 5 to 100 parts by weight based on 1 part by weight of cellulose.

5. The method of claim 1 wherein said activation is for 0.5 to 5 hours at 30° to 150° C.

6. In the method of manufacturing sulfated cellulose by sulfating cellulose with Lewis base - $SO_3$ complex in a reaction dispersant, the improvement comprising prior to sulfation, activating the cellulose for 20 minutes to 5 hours at 30° to 165° C in a mixture of tertiary amine and amine hydrochloride, the amount of tertiary amine being between about 3 to 500 parts by weight for each part by weight of cellulose and the proportion of amine hydrochlorides is between about 0.2 to 12 mols per glucose unit of cellulose.

7. The method of manufacturing sulfated cellulose according to claim 6, wherein the tertiary amines are selected from the group consisting of pyridine, picoline, lutidine, trimethyl amine, triethyl amide, tripropyl amine, and tributyl amine, and mixtures thereof.

8. The method of manufacturing sulfated cellulose according to claim 6, wherein the amine hydrochlorides are selected from the group consisting of compounds whose structure may be expressed by the following general formula I:

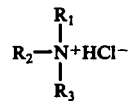

where:

$R_1$, $R_2$, $R_3$ = hydrogen, phenyl radical and alkyl radicals having 6 or less carbon atoms and compounds whose structure may be indicated by the following general formula II:

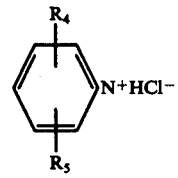

where:

$R_4$, $R_5$ = hydrogen or methyl radical and a mixture of compounds of the general formulas I and II.

9. The method of claim 6 wherein the proportion of amine hydrochlorides is between about 1 to 4 mols per glucose unit of cellulose.

* * * * *